US005941319A

United States Patent [19]

Juan

[11] Patent Number: 5,941,319

[45] Date of Patent: Aug. 24, 1999

[54] ELECTRIC WRENCH DRIVING SYSTEM

[76] Inventor: Chih-Chen Juan, No. 282, Lan Tan, Tung-Yang Hsin-Chun, Chiayi City, Taiwan

[21] Appl. No.: 09/181,059

[22] Filed: Oct. 27, 1998

[51] Int. Cl.[6] .............................. B23Q 5/00; B25B 15/00

[52] U.S. Cl. .......................... 173/93.5; 173/93; 173/117; 173/176

[58] Field of Search ........................... 173/93, 93.5, 93.6, 173/117, 217, 176

[56] References Cited

U.S. PATENT DOCUMENTS

| | | | |
|---|---|---|---|
| 2,940,566 | 6/1960 | Conover, Jr. | 173/93.5 |
| 4,947,939 | 8/1990 | Hung | 173/93 |
| 5,435,398 | 7/1995 | Juan | 173/93.5 |
| 5,740,892 | 4/1998 | Huang | 173/93 |
| 5,839,518 | 11/1998 | Setsuko | 173/93.5 |

*Primary Examiner*—Scott A. Smith

*Attorney, Agent, or Firm*—Pro-Techtor International Services

[57] ABSTRACT

An electric wrench driving system, comprising a motor; a catching system; and a shaft. The catching system is driven by the motor in a rotational movement and further comprises a main body; a catching piece, mounted on the main body and oriented along the direction of the rotational movement, with a heavy end and a light end; a blocking rod; an eccentric arm; and a spring, pulling on the eccentric arm to fix the catching piece on the blocking rod below a threshold velocity of the rotational movement. The shaft has an insertion piece to be engaged by the catching piece for driving the shaft. When the threshold velocity of the rotational movement is exceeded, the eccentric arm releases the catching piece, and in a regular direction of the rotational movement the heavy end is pulled outward, with the light end engaging with the insertion piece of the shaft, driving the shaft. In a reverse direction of the rotational movement the heavy end is pulled outward, with the light end bumping against the insertion piece of the shaft, such that the heavy end engages with the insertion piece of the shaft, driving the shaft.

2 Claims, 5 Drawing Sheets

ELECTRIC WRENCH DRIVING SYSTEM

BACKGROUND OF THE INVENTION

1. Field of the Invention

The present invention relates to an electric wrench driving system, particularly to an electric wrench driving system of simple structure and well-defined movement.

2. Description of Related Art

As shown in FIG. 2, a conventional electric wrench 1 comprises a motor 11; a catching system 2; and a shaft 13. The catching system 2 has a main body 21, a catching piece 22 on the main body 21, two catching arms 23, and a spring 24, which connects the two catching arms 23. A balancing rod 221 extends from the catching piece 22 into the main body 21 towards the motor 11. A transverse hole 222 is bored through the balancing rod 221, passed through by a positioning pin 223. The two catching arms 23 each have a lower end, which is mounted on the main body 21, swing upward in an arc-like shape along the main body 21 and have an upper end, into which a groove 231 and another groove 232 perpendicular thereto are cut. The grooves 231, 232 respectively accommodate the balancing rod 221 and the positioning pin 223, fixing the catching piece 22. The shaft 13 has a driven end which passes through the main body 21 and carries an insertion piece 131 for engaging with the catching piece 22.

FIG. 3 illustrates the engaging function of the conventional electric wrench shown in FIG. 2. When the motor 11 drives the main body 21 of the catching system 2 in a rotational movement up to a certain velocity, as indicated by the arrow in FIG. 3, the two catching arms 23 are driven outward by a centrifugal force and do not contact the positioning pin 223, allowing the catching piece 22 to sway freely, for driving the shaft 13 via the insertion piece 131. However, when the catching arms 23 depart from the positioning pin 223 on the catching piece 22, the catching piece will not necessarily sway as indicated in FIG. 3, but sometimes sway the other way, as shown in FIG. 4. In this state, the catching piece 22 is oriented as indicated by the dotted lines in FIG. 4 and is unable to drive the shaft 13. Accordingly, with a reverse rotational movement of the main body, the catching piece 22 is possibly oriented in a way unable to drive the shaft 13. Then a user has to turn off and on the motor 11 or to reverse the rotation thereof or to change the orientation of the catching piece 22 to allow the catching piece 22 to engage with the insertion piece 131 and to drive the shaft 13 again. Therefore, the conventional electric wrench 1 will drive the shaft 13, but only with the inconvenience described above.

SUMMARY OF THE INVENTION

The main object of the present invention is to provide an electric wrench driving system of simple structure and easy use.

Another object of the present invention is to provide an electric wrench driving system, which moves as specified, in all states ensuring proper driving.

The main characteristic of the present invention is a catching piece held by a rod on the main body and having an asymmetric distribution of weight. A blocking rod extends from the catching piece through the main body towards the motor. An eccentric arm is mounted on the main body, near the motor. The eccentric arm has an upper end with a groove for engaging with the blocking rod. When the electric wrench is driven in a rotational movement up to a certain velocity, the eccentric arm undergoes a centrifugal force and departs from the blocking rod. The relatively heavy end of the catching piece is pulled outward by the centrifugal force, while the relatively light end of the catching piece is driven inward. The electric wrench of the present invention further has a shaft with an insertion piece. When the electric wrench rotates towards the light end of the catching piece, the light end moves inward to a position that lets the catching piece engage with the insertion piece on the shaft, so as to drive the shaft. When the electric wrench is driven in a reverse rotation, the light end of the catching piece collides with the insertion piece and moves outward. Then the heavy end of the catching piece moves inward up to a position that lets the catching piece engage with the insertion piece on the shaft, so as to drive the shaft in the reverse direction. Thus, no matter which way the electric wrench rotates, the shaft is engaged with and driven properly.

The electric wrench driving system of the present invention comprises a catching system, driven by a motor in a rotational movement, and a shaft, contacted and driven by the catching system. The motor has a driving shaft, and the shaft has a front end near the catching system with an insertion piece. The catching system further comprises a main body, a catching piece, a blocking rod, an eccentric arm, and a pulling spring. The main body has a front end, facing the motor, with a connecting part, connected with the motor, and a through hole. The main body also has a rear end with an accommodating space for accomodating the insertion piece of the shaft. Furthermore, the main body has a peripheral surface with an opening to the accommodating space for taking in the catching piece. The catching piece has two ends of different weights to the two sides of the rod. The blocking rod passes through a hole in the catching piece, being rotatable within the hole. The eccentric arm has a lower end, fastened to the main body on the peripheral surface close to the front end thereof, and an upper end with a groove. The groove fits on the blocking rod. A pulling spring is mounted between the main body and the eccentric arm to pull the eccentric arm inward and have the groove on the eccentric arm engage with the blocking rod. When the main body is rotated by the motor, beyond a certain velocity the centrifugal force on the eccentric arm exceeds the elastic force of the pulling spring, allowing the catching piece to sway freely. Then the heavy end of the catching piece projects outward from the peripheral surface of the main body, with the opposite light end of the catching piece moving inward into the accommodating space of the main body, so as to engage with the insertion piece of the shaft and drive the shaft. Since a single eccentric arm is employed and the catching arm has an asymmetric weight distribution, proper driving of the shaft is ensured. Therefore the electric wrench driving system of the present invention combines simple structure with high reliability.

The present invention can be more fully understood by reference to the following description and accompanying drawings.

DETAILED DESCRIPTION OF THE PREFERRED EMBODIMENT

Figure 1:
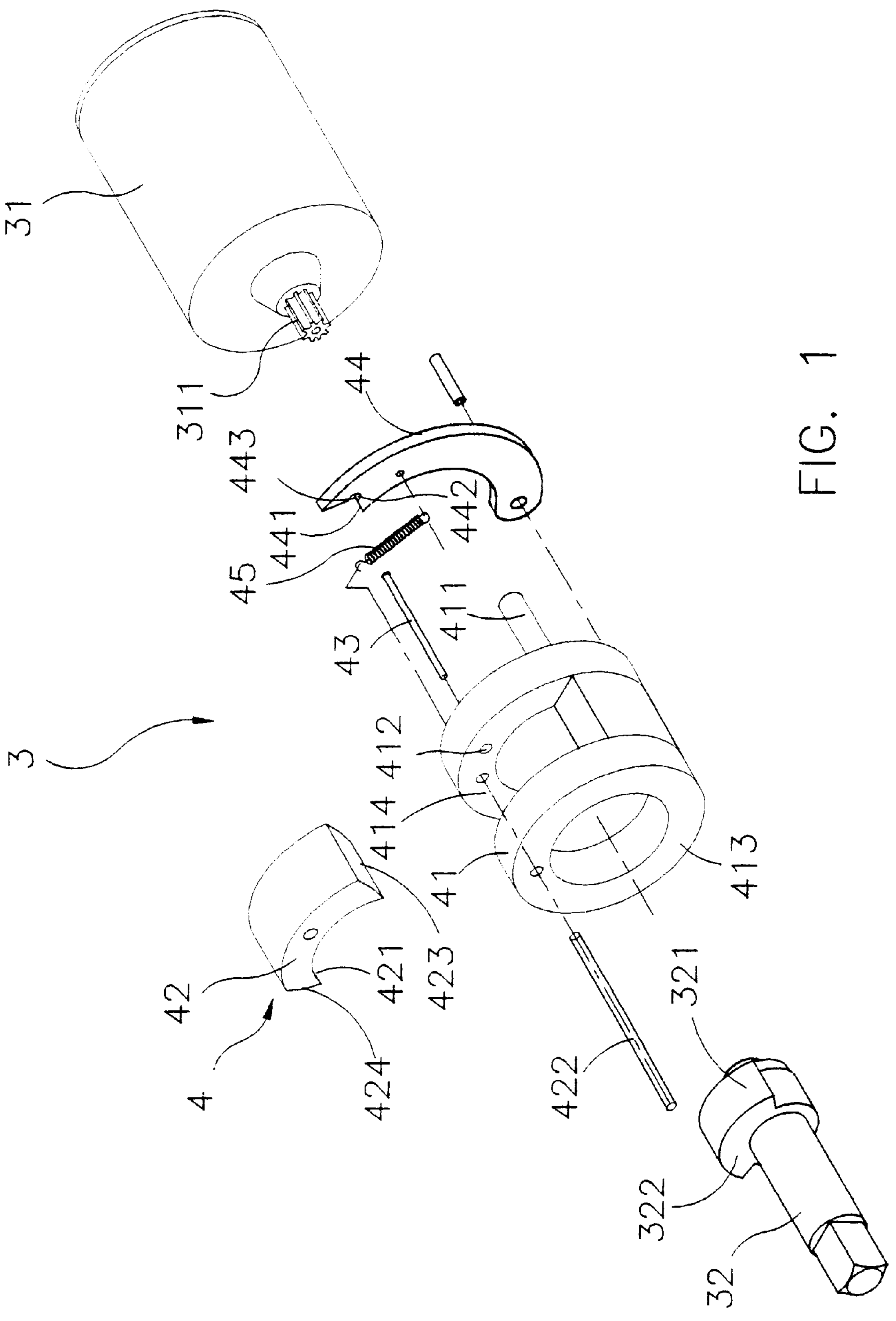
FIG. 1 is a perspective exploded view of the electric wrench driving system of the present invention.
Figure 2:
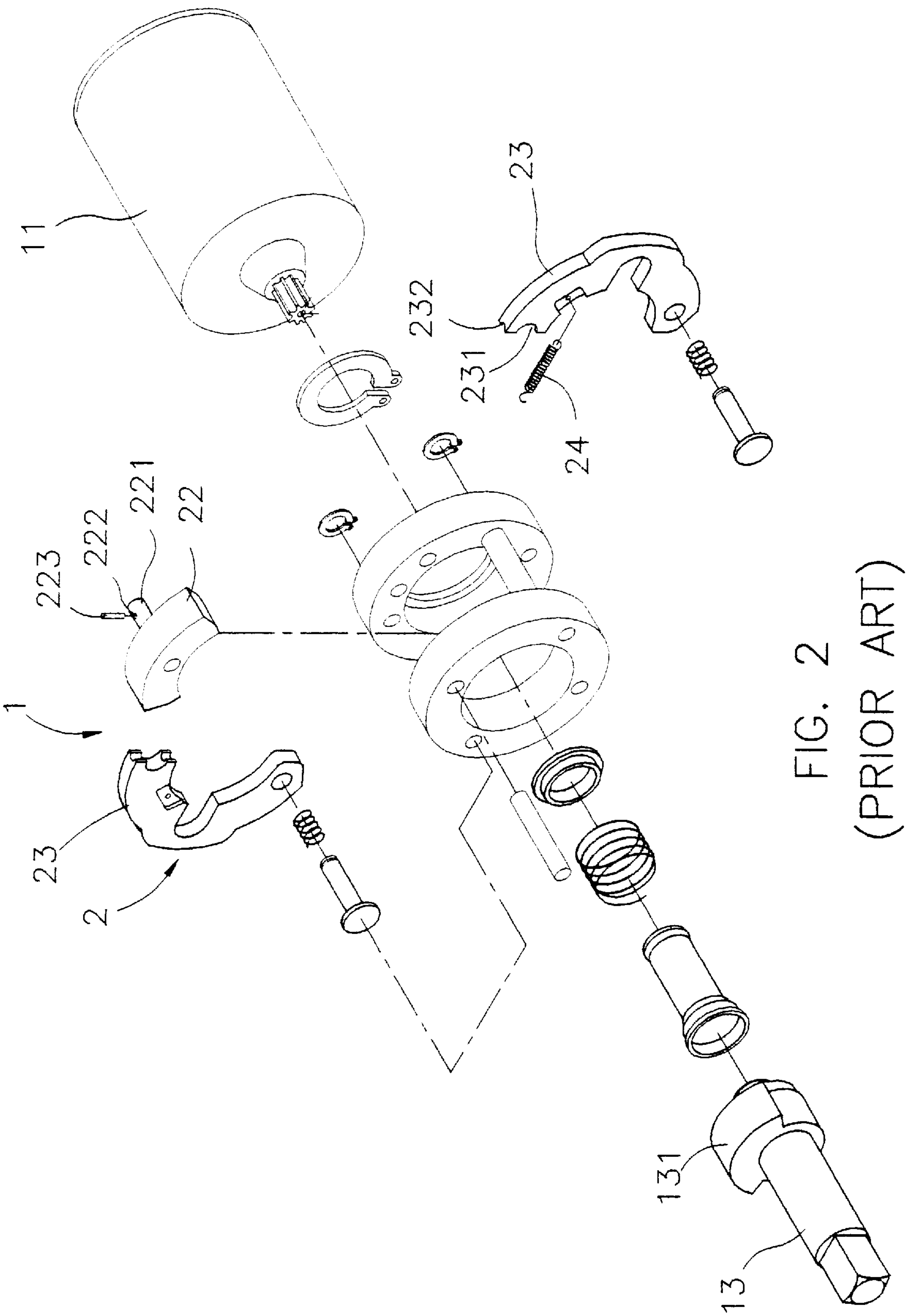
FIG. 2 (PRIOR ART)
FIG. 2 is a perspective exploded view of a conventional electric wrench.
Figure 4:
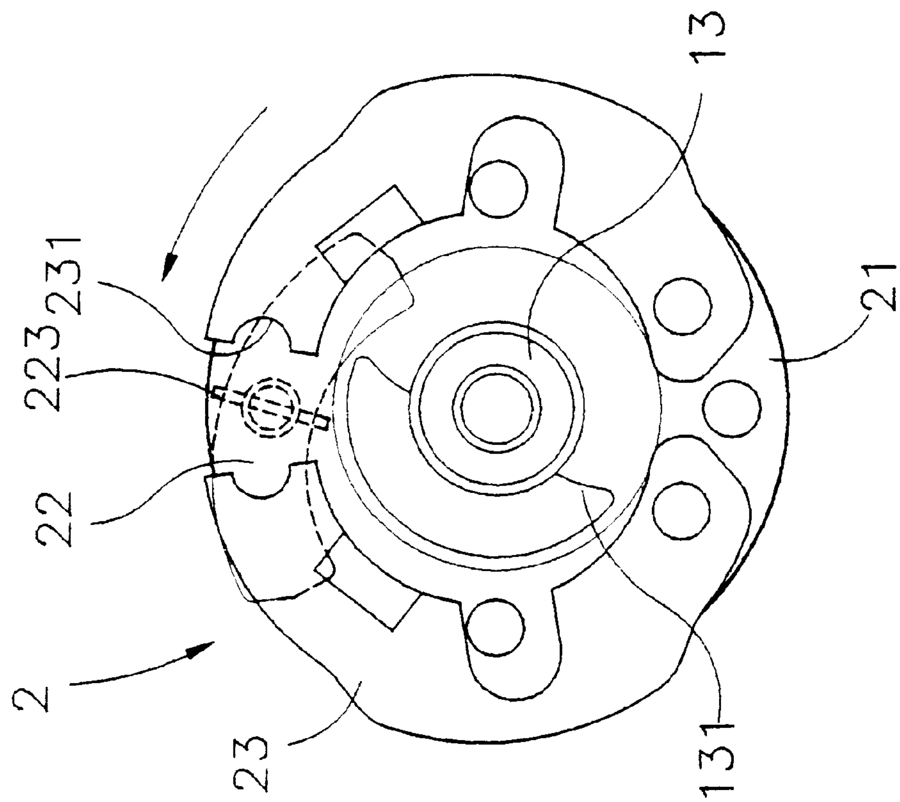
FIG. 4 (PRIOR ART)
FIG. 4 is a schematic illustration of the catching system of a conventional electric wrench when rotating in the reverse direction.
Figure 3:
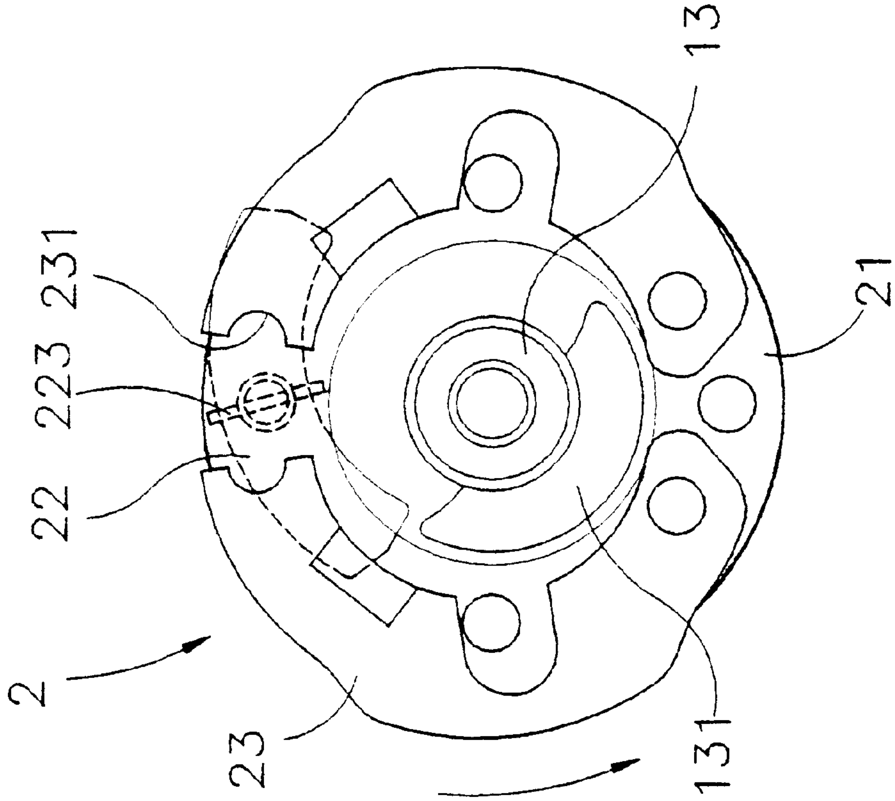
FIG. 3 (PRIOR ART)
FIG. 3 is a schematic illustration of the catching system of a conventional electric wrench when rotating in the regular direction.
Figure 5:
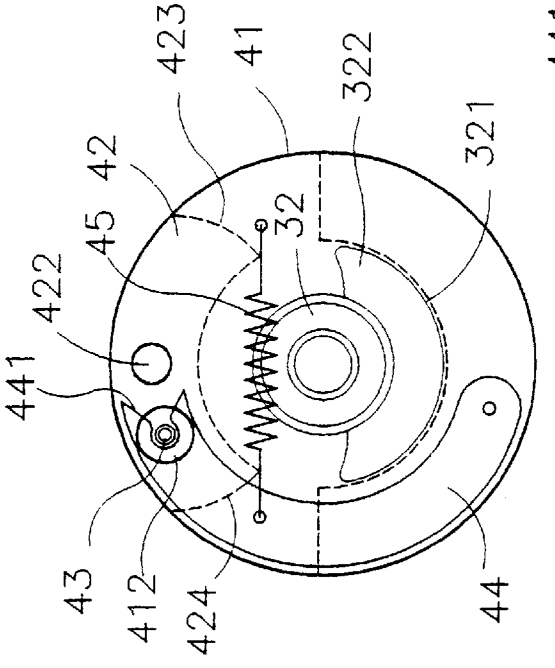
FIG. 5 is a front view of the catching system of the electric wrench driving system of the present invention.

As shown in FIGS. 1 and 5, the electric wrench 3 of the present invention comprises: a motor 31; a catching system 4; and a shaft 32. The motor 31 has a driving shaft 311. The catching system 4 further comprises: a main body 41; a catching piece 42; a blocking rod 43; an eccentric arm 44; and a pulling spring 45. The main body 41 has a front end, facing the motor 31 and having a connecting part 411, connected with the motor 31, and a through hole 412, such that the main body 41 is driven by the motor 31 in a rotational movement. The main body 41 also has a rear end with an accommodating space 413. for accomodating the insertion piece of the shaft. Furthermore, the main body 41 has a peripheral surface with an opening 414 to the accommodating space for taking in the catching piece 42. The catching piece 42 has an inner periphery 421 and is held within the opening 414 by a balancing rod 422. The catching piece 42 has two ends of different weights to the two sides of the balancing rod 422, a heavy end 423 and a light end 424. The blocking rod 43 passes through a hole 412 in the main body, being connected with the light end 424 of the catching piece 42 and freely rotatable within the hole 412. The eccentric arm 44 has a lower end, fastened to the main body on the peripheral surface close to the front end thereof, and an upper end with a groove 441. The groove 441 has a deepest location with an additional depression 442, which fits on the blocking rod 43. Towards the depression 442 the groove narrows continuously, forming a retarding part 443. The retarding part 443 holds back the blocking rod 43, when leaving the depression 442. While the main body rotates below a certain threshold velocity, the blocking rod 43 stays in the groove 441, and after exceeding the threshold velocity the blocking rod 43 and the groove 441 go apart immediately. The pulling spring 45 is mounted between the main body 41 and the eccentric arm 44 to pull the eccentric arm 44 inward and have the groove 441 on the eccentric arm 44 engage with the blocking rod 43. Thus the threshold velocity is controlled, at which the eccentric arm 44 engages with or disengages from the blocking rod 43. When the main body 41 is rotated by the motor 31 below the threshold velocity, the eccentric arm 44 is pulled inward, engaging with the blocking rod 43.

The shaft 32 has a front end, which is located in the accommodating space 413 of the main body 41 and carries an insertion piece 322. The insertion piece has an outer periphery 321 that corresponds to the inner periphery 421 of the catching piece 42, as explained below. Preferably the inner periphery 421 and the outer periphery 321 have equal lengths, or the inner periphery 421 has a slightly smaller length than the outer periphery 321.

Figure 6:
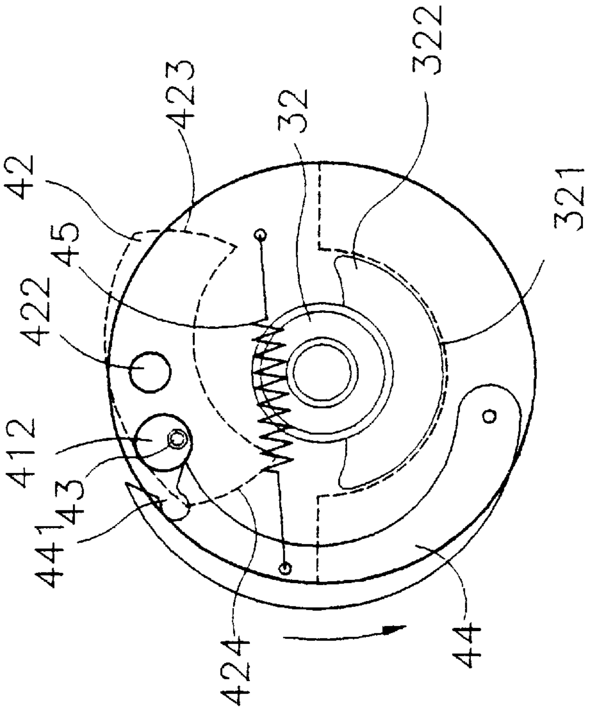
FIG. 6 is a schematic illustration of the catching system of the electric wrench driving system of the present invention when rotating in the regular direction.

Referring to FIG. 1, when the main body 41 is rotated by the motor 31 at the threshold velocity in the direction indicated by the arrow in FIG. 6, the centrifugal force on the eccentric arm 44 exceeds the elastic force of the pulling spring 45, such that the eccentric arm 44 disengages from the blocking rod 43. Since the blocking rod 43 is rotatable within the hole 412 in the main body 41, the catching piece 42 is no longer fixed, but allowed to sway freely against the main body 41. Due to the uneven weight distribution of the catching piece 42, the heavy end 423 is pulled outward, projecting from the peripheral surface of the main body 41, while the light end 424 of the catching piece 42 moves inward into the accommodating space 413 of the main body 41, so as to engage with the insertion piece 322 of the shaft 32 and drive the shaft 32.

In the state just described the wrench rotates towards the light end 424 of the catching piece 42. In this state the light end 424 engages directly with the insertion piece 322 of the shaft 32, driving the shaft 32. When rotating in the reverse direction, the catching system 4 engages readily with the insertion piece 322 of the shaft 32, driving the shaft 32 in the reverse direction.

Figure 7:
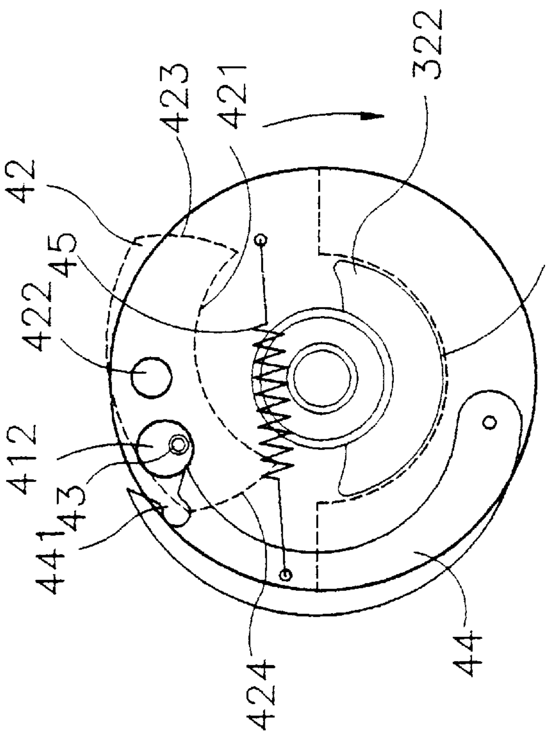
FIGS. 7–9 are continuous schematic illustrations of the catching system of the electric wrench driving system of the present invention when rotating in the reverse direction.
Figure 9:
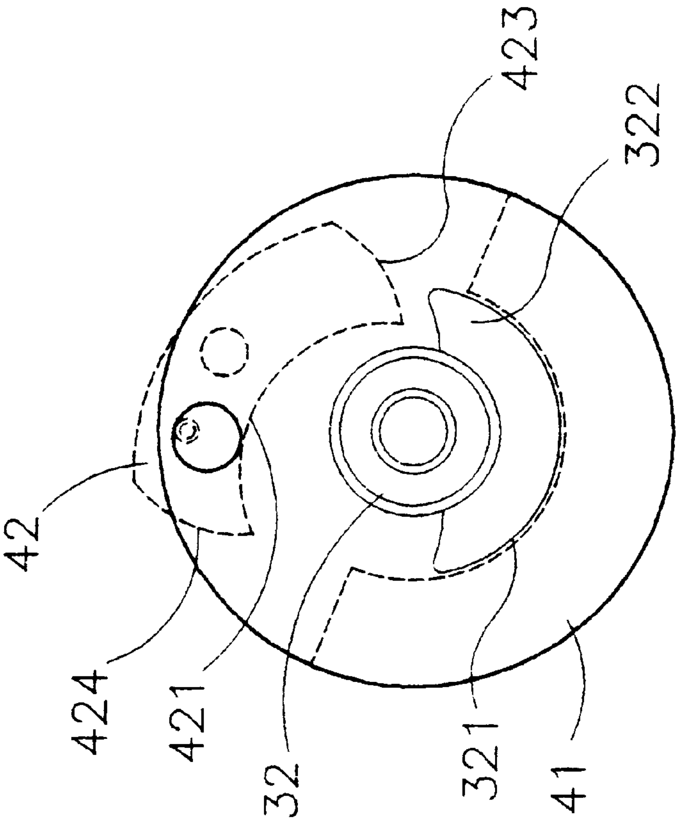
Figure 8:
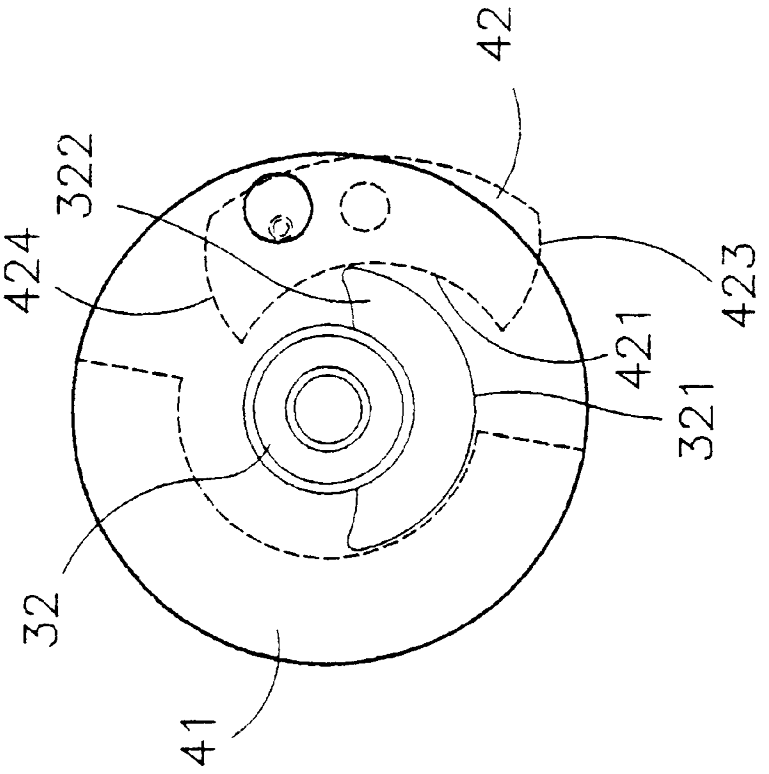

Referring again to FIG. 1, when the motor 31 drives the main body 41 of the catching system 4 in the direction indicated in FIG. 7, exceeding a reverse threshold velocity, the centrifugal force on the eccentric arm 44 becomes larger than the elastic force of the pulling spring 45, and the heavy end 423 of the catching piece 42 is driven outward. Then, as shown in FIG. 8, the inner periphery 421 on the light end 424 contacts the insertion piece 322 of the shaft 32. However, at this moment the insertion piece 322 does not engage with the catching piece 42. Since the inner periphery 421 has a larger length than or a length equal to the outer periphery 321, the light end 424 will be pushed outward, after the catching piece 42 has contacted the insertion piece 322. Consequently, as shown in FIG. 9, the heavy end 423 turns inward. Because of the main body 41 rotating fast, the heavy end 423 of the catching piece 42, even before having completed the outward movement, engages with the insertion piece 322 of the shaft 32, driving the shaft 32.

As exlained above, the main body 41 of the catching system drives the shaft 32 when rotating in the regular direction, as indicated in FIG. 6, as well as in the reverse direction, as indicated in FIG. 7. When rotating in the reverse direction, the catching piece 42 contacts the insertion piece 322, causing the heavy end 424 to turn inward and to engage with the insertion piece 322, such that the shaft 32 is driven in the reverse direction. Thus the electric wrench 3 of the present invention works fast and well-defined in all operational states and will not fail to drive the shaft. Furthermore, since a single eccentric arm is employed, the electric wrench 3 of the present invention has a simple structure, as compared to a conventional electric wrench.

While the invention has been described with reference to a preferred embodiment thereof, it is to be understood that modifications or variations maybe easily made without departing from the spirit of this invention which is defined by the appended claims.

I claim:

1. An electric wrench driving system, comprising:

a motor;

a catching system, driven by said motor in a rotational movement in a regular direction or a reverse direction, below or above a threshold velocity around an axis which defines an inward direction and an outward direction, said catching system further comprising a main body, a catching piece, connected to said main body by a balancing rod and having an uneven weight distribution with a heavy end and a light end, said catching piece rotating in said regular direction towards said light end and in said reverse direction towards said heavy end, an eccentric arm, having a lower end, which is connected to said main body, and an upper end with a groove, a pulling spring, mounted between said main body and said eccentric arm and below said threshold velocity of said rotational movement pulling said eccentric arm inward, whereas above said threshold velocity of said rotational movement said eccentric arm is pulled outward by a centrifugal force, and a blocking rod having a diameter, mounted on said catching piece and below said threshold velocity of said rotational movement engaging with said groove on said upper end of said eccentric arm, such that said catching piece is fixed; and a shaft, having an insertion piece for engaging with said catching piece, so as to be driven by said rotational movement of said catching system;

wherein above said threshold velocity of said rotational movement in said regular direction said heavy end of said catching piece is pulled outward, such that said light end thereof engages with said insertion piece of said shaft, driving said shaft, and above said threshold velocity of said rotational movement in said reverse direction said heavy end of said catching piece is pulled outward, such that said light end thereof bumps against said insertion piece of said shaft and is pushed outward, causing said heavy end to engage with said insertion piece of said shaft, driving said shaft.

2. An electric wrench driving system according to claim 1, wherein said groove of said eccentric arm has an additional centered depression, continuously narrowing towards said depression, said depression having a width which is slightly larger than said diameter of said blocking rod, such that said blocking rod above said threshold velocity of said rotational movement leaves said groove with a delay.

* * * * *